United States Patent [19]
Wilder

[11] 3,875,124
[45] Apr. 1, 1975

[54] N-TERT-ALKYLAMINO PYRROLIDINYLTHIOCARBONYL SULFIDES

[75] Inventor: Gene R. Wilder, Medina, Ohio

[73] Assignee: Monsanta Company, St. Louis, Mo.

[22] Filed: Oct. 27, 1972

[21] Appl. No.: 301,649

Related U.S. Application Data

[62] Division of Ser. No. 44,658, June 8, 1970, Pat. No. 3,709,905.

[52] U.S. Cl. ......... 260/79.5 B, 260/326.83, 260/784
[51] Int. Cl. ......................... C08d 9/00, C08c 11/40
[58] Field of Search .................. 260/79.5, 784, 793

[56] References Cited
UNITED STATES PATENTS
2,381,392  8/1945  Smith, Jr. ........................... 260/793

Primary Examiner—Christopher A. Henderson

[57] ABSTRACT

A compound of the formula

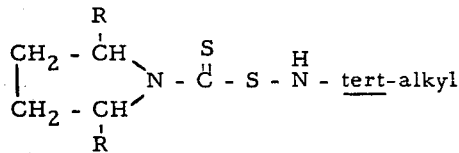

where R is hydrogen or lower alkyl which is useful for accelerating the vulcanization of diene rubber.

1 Claim, No Drawings

N-TERT-ALKYLAMINO PYRROLIDINYLTHIOCARBONYL SULFIDES

This is a division of application Ser. No. 44,658 filed June 8, 1970, now U.S. Pat. No. 3,709,905.

BACKGROUND OF THE INVENTION

The sulfenamides derived from dithiocarbamic acids are known to accelerate the vulcanization of rubber: Cooper U.S. Pat. Nos. 2,333,468 and 2,388,236; Carr and Smith U.S. Pat. No. 2,381,392; and Imperial Chemical Industries Limited British Pat. No. 880,912. Cooper pointed out that cyclopentamethylenethiocarbamyl piperidyl sulfide was an especially potent accelerator. The sulfenamides from cyclotetramethylenediothiocarbamic acids (pyrrolidinylthiocarbonyl sulfides) have not been heretofore described. In general, they lack the requisite stability or shelf life for commercial accelerators, but a stable class of improved accelerating properties has now been discovered.

SUMMARY OF THE INVENTION

The new accelerators possess the formula

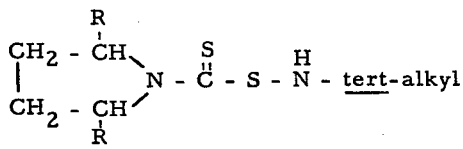

where tert-alkyl designates tertiary-alkyl of 4 to 8 carbon atoms and R is hydrogen or lower alkyl of 1 to 3 carbon atoms.

DESCRIPTION OF THE PREFERRED EMBODIMENTS

The new accelerators may be prepared by oxidative condensation of a salt of the dithiocarbamic acid and tert-alkyl amine. The preparation of tert-butylamino-1-pyrrolidinylthiocarbonyl sulfide is exemplary.

The dithiocarbamate is prepared in the customary way by adding 76 grams (1.0 mole) of carbon disulfide to a solution of 71 grams (1.0 mole) of pyrrolidine in 400 ml. of 10 percent aqueous sodium hydroxide. tert-Butyl N-chloroamine is prepared by adding 400 ml. of 18 percent sodium hypochloride to 230 grams of tert-butyl amine at 5°–10°C. The solution of the dithiocarbamate prepared as described above is then added over a period of 15 minutes to the tert-butyl N-chloroamine. The temperature is allowed to rise at will and reaches about 35°–40°C., after which stirring of the reaction mixture is continued for about an hour. The resulting precipitate is separated by filtration and the wet filter cake dissolved in petroleum ether and the water layer and insoluble portion separated. The sulfenamide crystallizes upon cooling the petroleum ether solution and is recovered by filtration. There is obtained 78 grams, m.p. 61°–2°C. Analysis gives 11.75 percent nitrogen and 28.81 percent, 28.05 percent sulfur compared to 12.8 percent nitrogen and 29.4 percent sulfur calculated for $C_9H_{18}N_2S_2$.

tert-Butylamino 2,5-dimethyl-1-pyrrolidinylthiocarbonyl sulfide is prepared by condensation of tert-butyl N-chloroamine with the sodium salt of 2,5-dimethyl-pyrrolindinylcarbodithioic acid. tert-Butyl N-chloroamine is prepared by adding 172 ml. of 16.9 percent sodium hypochlorite to 92 grams of tert-butylamine at 0°–8°C. The sodium salt of 2,5-dimethylpyrrolidinylcarbodithioic acid is prepared by adding 30.4 grams (0.4 mole) of carbon disulfide to 39.7 grams (0.4 mole) of 2,5-dimethylpyrrolidine in 160 grams of 10 percent sodium hydroxide at room temperature. The sodium salt is then added to the chloroamine dropwise in 12 minutes which causes the temperature to rise to 36°C. The reaction mixture is cooled to room temperature with stirring for 2 hours. The liquid product is extracted with ether, washed with water, dried, and recovered by vacuum stripping the solvent. Analysis gives 11.06 percent nitrogen and 25.96 percent sulfur compared to 11.37 percent nitrogen and 26.02 percent sulfur calculated for $C_{11}H_{22}N_2S_2$.

An oil-extended styrene-butadiene masterbatch is compounded comprising

| | Parts by Weight |
|---|---|
| SBR 1712* | 137.5 |
| Carbon black (ISAF) | 65 |
| Zinc oxide | 3 |
| Stearic acid | 1 |
| Aromatic oil softener | 1.5 |

*Styrene-butadiene copolymer rubber made by cold emulsion polymerization using a fatty acid and rosin soap emulsifier and extended with 37.5 parts by weight of highly aromatic processing oil.

To the masterbatch there is added:

| | |
|---|---|
| Sulfur | 2.2 |
| Accelerator | 0.6 |

The accelerator is selected from the series

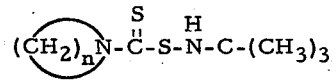

where n is 4, 5 or 6.

The stocks are vulcanized in the usual manner by heating in a press at 144°C. and the modulus of elasticity evaluated at optimum cure. The stocks are also evaluated in the Monsanto Oscillating Disk Rheometer, a curemeter which provides a complete cure curve. The Rheometer is described by Decker, Wise and Guerry, Rubber World, December 1962, page 68. $t_2$, $K_2$, RMT, and $t_{90}-t_2$ are from the Rheometer measurements where $t_2$ is the time in minutes for a rise of two Rheometer units above the minimum reading, $t_{90}$ is the time in minutes required to obtain a torque 90 percent of the maximum. The difference, $t_{90}-t_2$, is a measure of rate of cure. RMT is the maximum torque and, like the modulus at optimum time of press cure, is a measure of accelerating strength. $K_2$ is a specific rate constant obtained by assigning zero to the maximum Rheometer reading and increasingly higher numbers to the lower readings. These numbers are plotted on semi-log paper versus time in minutes. On this portion of the cure curve, only one reaction is involved and the cure curve is first order and a straight line is obtained. $K_2$ is in reciprocal minutes so that larger values mean faster cure. See Coran, Journal of Rubber Chemistry and Technology, p. 689 (1964).

The results are shown in the table below corresponding to the values of n in the aforesaid formula:

| n | Modulus of Elasticity In lbs/in² at Designated Cure Time in Minutes | Rheometer at 144°C. | | | |
|---|---|---|---|---|---|
| | | RMT | $t_2$ | $t_{90}-t_2$ | $K_2$ |
| 4 | 1560/40 | 53.9 | 14.9 | 17.1 | 0.193 |
| 5 | 1190/45 | 44.5 | 16.8 | 22.5 | 0.126 |
| 6 | 1250/45 | 48.4 | 19.4 | 28.6 | 0.096 |

A similar result is obtained in a silica reinforced natural rubber stock. The sulfur vulcanizable stocks are compounded comprising

| | Parts by Weight |
|---|---|
| Natural rubber smoked sheets | 100 |
| Hi-Sil 210* | 50 |
| Zinc oxide | 5 |
| Stearic acid | 3 |
| Sulfur | 3 |
| Accelerator | 1.5 |

*Hi-Sil 210 is a precipitated silica sold by PPG Industries.

The stocks are vulcanized in a press at 144°C. at optimum cure. The results are shown below:

| n | Modulus of Elasticity In lbs/in² at Designated Cure Time in Minutes | Rheometer at 144°C. | | |
|---|---|---|---|---|
| | | RMT | $t_2$ | $t_{90}-t_2$ |
| 4 | 1380/15 | 72.7 | 5.7 | 4.0 |
| 5 | 850/15 | 46.1 | 6.1 | 5.2 |

The tert-butylamino-1-pyrrolidinylthiocarbonyl sulfide vulcanizes rubber and may replace in whole or in part the usual sulfur-vulcanizing agent. For example, to the aforesaid styrene-butadiene masterbatch there is added:

| | Parts by Weight |
|---|---|
| N-1,3-dimethylbutyl-N'-phenyl-p-phenylenediamine | 2.0 |
| N-tert-butyl-2-benzothiazole sulfenamide | 1.2 |
| tert-butylamino-1-pyrrolidinylthiocarbonyl sulfide | 3.0 |

The stock is cured in a press at 153°C. in 35 minutes giving a modulus at 300 percent elongation of 750 lbs/in² and a tensile strength at break (750 percent elongation) of 2600 lbs/in².

tert-Butylamino-1-pyrrolidinylthiocarbonyl sulfide matches the accelerating strength of the commercial thiazole sulfenamide, N-tert-butyl-2-benzothiazole sulfenamide, with about half the accelerator dosage. The initial processing safety is somewhat less but is retained to a greater degree after stocks containing the accelerators are subjected to heat during storage. Moreover, the initial processing safety of the thiazole sulfenamide may be easily matched by the addition of a small amount of a prevulcanization inhibitor. The properties are illustrated by stocks compounded by adding to the styrene-butadiene masterbatch the following:

| Stock | A | B | C |
|---|---|---|---|
| Sulfur | 2.2 | 2.2 | 2.2 |
| N-1,3-dimethylbutyl-N'-phenyl-p-phenylenediamine | 2.0 | 2.0 | 2.0 |
| N-tert-butyl 2-benzothiazolesulfenamide | 1.2 | — | — |
| tert-butylamino-1-pyrrolidinylthiocarbonyl sulfide | — | 0.5 | 0.5 |
| N-(cyclohexylthio)phthalimide | — | — | 0.2 |

The properites of the freshly prepared stock are evaluated by the use of the Monsanto Oscillating Disk Rheometer at 153°C. and after storage in an atmosphere of nitrogen for 24 and 48 hours respectively at 70°C.

| | | Rheometer at 153°C. | | | |
|---|---|---|---|---|---|
| | | RMT | $t_2$ | $t_{90}-t_2$ | $K_2$ |
| unaged | A | 58.0 | 9.4 | 23.3 | .197 |
| | B | 58.0 | 7.4 | 17.3 | .299 |
| | C | 57.0 | 10.1 | 19.9 | .298 |
| Aged 24 hours | A | 55.6 | 5.9 | 20.5 | .105 |
| | B | 57.9 | 5.5 | 16.1 | .248 |
| | C | 57.3 | 7.7 | 17.3 | .276 |
| Aged 48 hours | A | 54.5 | 4.5 | 18.7 | .158 |
| | B | 56.8 | 4.3 | 13.8 | .268 |
| | C | 56.5 | 5.9 | 15.2 | .248 |

The properties of the new accelerators in an extended styrene-butadiene copolymer rubber and an EPDM rubber are illustrated in the following stocks:

| Stock | D | E | F | G |
|---|---|---|---|---|
| Styrene-butadiene rubber | 100 | 100 | — | — |
| EPDM rubber | — | — | 100 | 100 |
| Carbon black (HAF) | 52 | 52 | 80 | 80 |
| Zinc oxide | 4 | 4 | 5 | 5 |
| Stearic acid | 2 | 2 | — | — |
| Aromatic processing oil | 10 | 10 | 40 | 40 |
| Sulfur | 1.75 | 1.75 | 1.5 | 1.5 |
| 2,2'-dithiobis(benzothiazole) | — | — | 1 | 1 |
| 62% Zinc dibutyl dithiophosphate | — | — | 1.5 | 1.5 |
| tert-butylamino-1-pyrrolidinylthiocarbonyl sulfide | 0.66 | — | 1.0 | — |
| tert-butylamino-2,5-dimethyl-1-pyrrolidinylthiocarbonyl sulfide | — | 0.74 | — | 1.0 |
| Rheometer at 153°C. | | | | |
| RMT | 81.1 | 74.1 | | |
| $t_2$ | 7.6 | 10.0 | | |
| $t_{90}-t_2$ | 9.6 | 17.9 | | |
| Rheometer at 160°C. | | | | |
| RMT | | | 62.4 | 62.0 |
| $t_2$ | | | 4.6 | 4.1 |
| $t_{90}-t_2$ | | | 14.9 | 15.1 |

Stocks cured with the new accelerators resist aging in oxygen or air, and are much more resistant to post-cure reversion than stocks containing thiazole sulfenamide accelerators.

The sulfenamides of the invention accelerate the vulcanization of sulfur-vulcanizable diene rubbers, etiher natural or synthetic. These rubbers contain sufficient unsaturation to render them reactive with sulfur. Examples are butyl rubber, cis-4-polybutadiene, ethylene-propylene terpolymers (EPDM), polyisoprene, butadiene-1,3 homopolymers, butadiene-1,3 copolymers with other monomers, for example styrene, acrylonitrile, isobutylene and methylmethacrylate.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A process of accelerating the vulcanization of a sulfur-vulcanizable diene rubber which comprises heating rubber and sulfur with an accelerating amount of tertiary-butylamino-1-pyrrolidinylthiocarbonyl sulfide.

* * * * *